N. McCABE.
COMBINATION WIRE STRETCHER, STAPLE HOLDER, AND STAPLE PULLER.
APPLICATION FILED AUG. 9, 1913.
1,101,559.
Patented June 30, 1914.
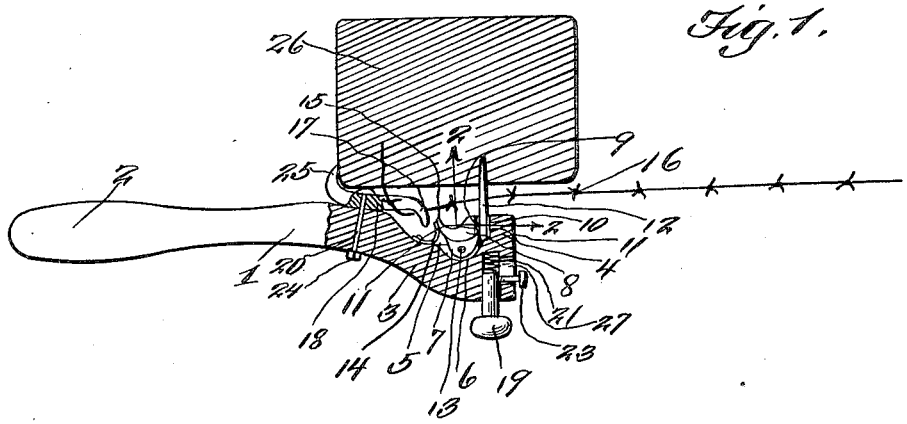
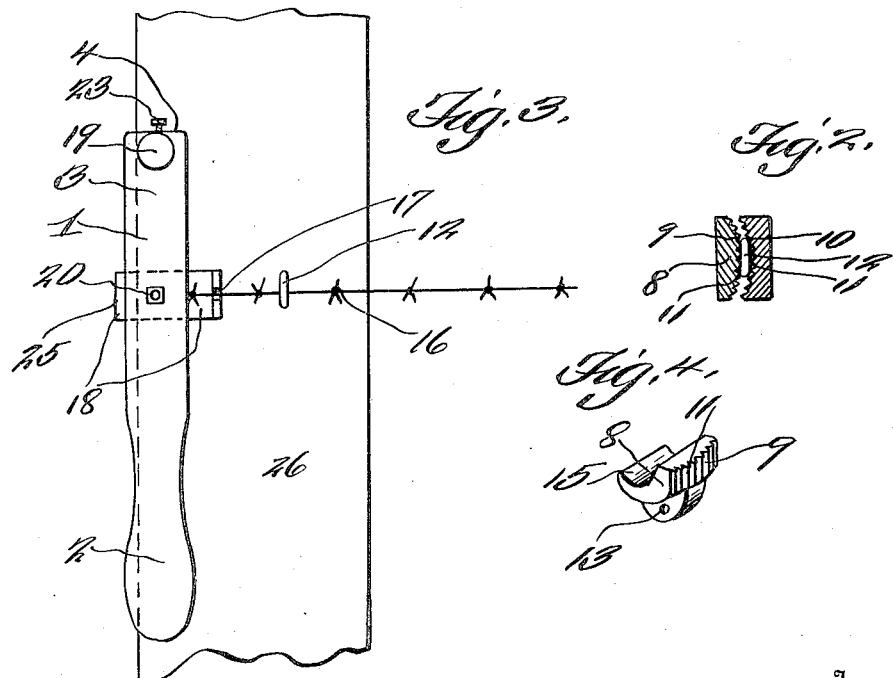

UNITED STATES PATENT OFFICE.

NICHOLAS McCABE, OF WATERVILLE, NEW YORK.

COMBINATION WIRE-STRETCHER, STAPLE-HOLDER, AND STAPLE-PULLER.

1,101,559. Specification of Letters Patent. Patented June 30, 1914.

Application filed August 9, 1913. Serial No. 783,914.

*To all whom it may concern:*

Be it known that I, NICHOLAS McCABE, a citizen of the United States, residing at Waterville, in the county of Oneida and State of New York, have invented a new and useful Combination Wire - Stretcher, Staple-Holder, and Staple-Puller; and I do hereby declare the following to be a full, clear, and exact description of the invention, such as will enable others skilled in the art to which it appertains to make and use the same.

This invention relates to a new and useful improved combined wire stretcher, staple holder, and staple extractor.

An object of the invention is to provide a simple, efficient and practical device of this nature, whereby a fence wire or the like may be stretched and held, and a staple started, and afterward by removing the device the staple may be driven home by an ordinary hammer to clench the wire.

In practical fields the details of construction may necessitate alterations, to which the patentee is entitled, provided the alterations fall within the scope of what is claimed.

The invention comprises further features and combination of parts, as hereinafter set forth, shown in the drawings and claimed.

In the drawings: Figure 1 is a view showing the application of the improved device. Fig. 2 is a sectional view on line 2—2 of Fig. 1. Fig. 3 is a view showing the device swung to one side after the staple has been started, so that the staple may be driven home. Fig. 4 is detail view of the dog 8.

Referring more particularly to the drawings, 1 designates a member terminating at one end in a handle 2, and at the other end in a goose-neck shaped portion 3 having a laterally extending lug 4. The face 5 of the goose-neck portion 3 is constructed with a recess 6, in which the ear 7 of the dog 8 is pivoted. The adjacent faces 9 of the dog and 10 of the lug 4 are provided with serrations or teeth 11, so as to prevent slipping of the staple 12, when held between the dog and the lug 4. The pivot of the dog is designated by the numeral 13. Interposed between the goose-neck portion 3 and the dog is a spring 14, the tendency of which is to hold the dog against the staple. To insert the staple in the mouth of the device, that is, between the dog and the lug 4, the operator places his finger at 15 and pulls the dog backward against the action of the spring 14. After the staple has been placed in the mouth and held as arching over the wire 16, which is caught in the claw 17 of the member 18 so as to be stretched and held, the operator hammers upon the knob 19 with an ordinary hammer, only sufficient to start the staple, then the member is swung upon its pivot 20 so that the mouth of the device is removed from the staple, after which the staple may be driven home by the usual hammer. An advantage in yieldably mounting the knob 19, is to permit the same to be struck by the hand of the operator, to relieve the sudden impact or jar to the hand. Furthermore if the knob is struck with a hammer, it will not tend to mash or disfigure the knob, owing to the same being yieldably mounted. It is to be remembered, however, that the staple is not to be entirely driven home by hammering upon the knob 19. The knob 19 is only struck either by the hand or with the hammer, merely to start the staple, then the member 1 is swung to one side upon the pivot 20, and the staple may be driven home by blows from the hammer. A spring 21 holds the knob 19 in an outward position. The pivot 20 comprises a bolt, which passes through the member 18 (which is constructed with the claw 17), and is provided with a nut 24. The member 18 at one end is formed with a hook 25, which engages the post 26, when stretching the wire and holding the same, as shown in Fig. 1. When the claw 17 is not being used for receiving and holding the wire, it may be used for extracting a staple, when repairing wire fences.

The invention having been set forth, what is claimed as new and useful is:—

1. In combination, a member having means to engage a fence wire and provided with a goose-neck portion at one end terminating in a lug constituting a jaw, said goose-neck portion having a recess in its under face, a device having an ear pivoted in said recess and constituting a coöperating jaw whereby a staple may be held, and means for holding said device against a staple placed in said jaws.

2. In combination, a member having means to engage a fence wire and provided with a goose-neck portion at one end terminating in a lug constituting a jaw, said goose-neck portion having a recess in its under face, a device having an ear pivoted in said recess and constituting a coöperating jaw whereby a staple may be held, means for holding said device against a staple placed in said jaws, and a yieldably supported member on said goose-neck to receive the blow of a hammer for starting the staple.

3. In combination, a member including a wire engaging means and having a handle at one end and a goose-neck portion at the other end terminating in a lug having serrations constituting a jaw, said goose-neck having a recess in its under face, a dog having an ear pivoted in said recess and provided with serrations and constituting a movable jaw whereby a staple may be held, said dog having a finger, a spring interposed between the finger and the goose-neck for holding the dog in engagement with said staple, and a yieldably supported knob carried by the goose-neck and designed to receive a blow from a hammer for starting the staple.

In testimony whereof I have signed my name to this specification in the presence of two subscribing witnesses.

NICHOLAS McCABE.

Witnesses:
JOHN T. FULMER,
ORRIN TERRY.

Copies of this patent may be obtained for five cents each, by addressing the "Commissioner of Patents, Washington, D. C."